ary Office 3,669,681
Patented June 13, 1972

3,669,681
SHORTENING COMPOSITION CONTAINING SILICON DIOXIDE AND A BRIDGING AGENT, AND BAKED GOODS CONTAINING SAME
Myron D. Shoaf, Battle Creek, Mich., Frederick M. Ketch, Hemet, Calif., and Thomas S. Wong, Danbury, Conn., assignors to General Foods Corporation, White Plains, N.Y.
No Drawing. Continuation-in-part of application Ser. No. 723,601, Apr. 23, 1968. This application Dec. 9, 1970, Ser. No. 96,649
Int. Cl. A21d 13/00; A23d 5/00
U.S. Cl. 99—86     12 Claims

ABSTRACT OF THE DISCLOSURE

The present invention relates to a shortening which is particularly useful in products which are heated prior to consumption. Edible oils are mixed with silicon dioxide and a bridging compound and the result is a shortening that will not weep or run at elevated temperatures, which retains desirable mouth feel characteristics of the untreated oil.

RELATED APPLICATION

This application is a continuation-in-part of our copending application, Improved Shortening, Ser. No. 723,-601, filed Apr. 23, 1968 now abandoned.

BACKGROUND OF THE INVENTION

The invention is related to food products which are to be heated in an oven prior to consumption and which contain high fat fillings or toppings and to the fat used therein.

Recently, consumer demand has resulted in the manufacture of an ever growing variety of products such as ready-to-bake pies and toaster products, which are to be heated prior to consumption. These products have primarily been restricted to fruit fillings due to the difficulties encountered when trying to use other fillings which would require a high percentage of fats or oils; the difficulty being that the oils tend to run when they are heated, thus separating out from the fillings and ruining the taste characteristics of both the filling and the dough surrounding the filling. Some attempts have been made to overcome this deficiency by using hydrogenated oils or by using higher melting fats in place of oils. However, neither of these modifications has proved completely satisfactory. Also, the use of higher melting fats results in undesirable changes in the taste characteristics associated with the oil. Some attempts have been made to gelatinize the oil in order to prevent it from running in products which are heated. Here again the taste characteristics of the gelled oil are completely different and undesirable as compared to the original oil.

Attempts have also been made to utilize a higher fat content in icings which are exposed to high temperatures, while preventing the icing from running at the higher temperatures. The various techniques used have only been moderately successful in that they have only allowed the fat content of icings to be increased to about 9 percent as a maximum. In addition, the icings are still found to run when they are heated, thus preventing their successful utilization on toaster products, as the running icing would quickly foul the toaster.

It is an object of the present invention to produce a shortening which is suitable for use in high fat fillings or coatings which would have a stable viscosity.

It was a further object of this invention to develop a shortening which would retain many of the desirable taste characteristics of a room temperature oil while not being limited to use at low levels or low temperatures in products to be heated.

It was still a further object of this invention to produce a heat stable shortening which could be used in combination with other ingredients to prepare heat stable icings and a large variety of food fillings.

SUMMARY

The product of this invention is a shortening which can be used in food products intended to be heated and has the advantage of having a controlled viscosity such that it will not weep or run at elevated temperatures, up to the smoke point of the shortening. The term "shortening" as used in this invention refers to an edible oil which has been modified by the addition of silicon dioxide and a bridging compound, such that the oil takes on the characteristics of a thick spreading shortening which is heat stable at elevated temperatures. The shortening thus prepared is particularly useful as it can be added to a variety of products at very high levels. Indeed, it is possible to make a 90 percent fat filling with the product of this invention, the fat filling being stable at the elevated temperatures and exhibiting desirable mouth feel characteristic of a room temperature oil.

The term "oil" as used in this invention refers to edible oils and some vegetable and animal fat fractions, those fractions which exhibit liquid type properties at room temperatures.

The term "silicon dioxide" is meant particularly to be colloidal silicon dioxide wherein the particle size preferable does not exceed 50 millimicrons.

The term "bridging compound" refers to the additional compound added in order to bind the oil in a stable matrix formed by the silicon dioxide and the bridging compounds. The bridging compound of this invention is a polyhydric alcohol or an ester of a polyhydric alcohol.

The product of this invention is particularly useful in high fat toppings and high fat fillings in toaster products. The term "toaster products" is used to refer to the type of products wherein a filling is surrounded by a continuous dough phase and is meant to be heated in the toaster by the consumer prior to consumption. The shortening of this invention is also particularly suited to use in fillings for ready-to-bake pies. Ready-to-bake pies refer to the pies which have a pie crust surrounding the filling.

The product of this invention is also suitable for use in preparing spreads for products which will be heated. The aforementioned uses and many other uses for the product of this invention will become apparent from the description of the preferred embodiment and the examples included therein.

DESCRIPTION OF THE PREFERRED EMBODIMENT

The shortening of this invention is a blend of an edible oil, colloidal silicon dioxide and a bridging compound. The edible oil, when mixed with the silicon dioxide and the bridging compound, forms a shortening with a thick-spreading consistency which is particularly useful in products to be heated as it is stable at temperatures up to the smoke point of the shortening.

The oils used are generally unsaturated, edible oils such as winterized cottonseed oil and unhydrogenated or partially hydrogenated safflower oil. However, it is also possible in producing the products of this invention to use vegetable fats and some animal fat fractions which exhibit liquid type properties at room temperatures.

The colloidal silicon dioxide having a particle size preferable from 7 to 50 millimicrons, is added to the oil at a level of from about 0.1 to 11.0 percent by weight of the oil in order to obtain best results, although the desired effects can be obtained outside of this range. As this product is primarily intended for use with other ingredients in order to make a variety of high fat fillings, the exact amount of silicon dioxide to be used will vary depending upon the type of food filling being prepared. The amount of silicon dioxide will also vary depending upon the bridging compounds selected. However, in all instances it will be found that a desirable shortening can be prepared if the silicon dioxide is used at the levels indicated. While the exact mechanism involved in forming the shortening when mixing the oil with the silicon dioxide is not known, it has been found that particle size is important. If course particles of silicon dioxide are used, the desired effects will not be achieved.

It has been found that a variety of bridging compounds can be used. Generally speaking, polyhydric alcohols and particularly glycerol, propyleneglycol, sorbitol, mannitol, xylitol, and polyethylene glycol 6000 have proven to be satisfactory bridging agents. As used here, polyhydric alcohols can be defined as straight chain organic compounds in which the only functional group is hydroxyl. Various esters of the polyhydric alcohols have also been found to be satisfactory bridging compounds such as glycerol or sorbitol monostearate, monooleate, or monopalmitate. Also, the polyalkalene counterparts of the aforementioned esters have been found satisfactory as a bridging compound, such as polyoxyethylene sorbitan monostearate. The exact amount of bridging compound to be used will vary depending upon the specific bridging compound selected, the amount of silicon dioxide used, and the food filling being prepared. However, satisfactory results are generally achieved if the level of the bridging compound is from 0.1 to 7.0 percent by weight of the oil.

The product of this invention can be prepared as follows: Heat the oil to 150° to 200° F., slowly add the silicon dioxide while subjecting the oil to high shear mixing; after completely adding the silicon dioxide, continue to mix for about 2 to 3 minutes, then add the bridging compound as quickly as possible (if a bridging compound is used which is solid at room temperature, it should be heated prior to addiiton), stir and allow the shortening to cool. It will be found that the resulting product is a shortening which has a thick-spreading consistency and will exhibit little change in viscosity at elevated temperatures. The following examples will illustrate how the product of this invention can be utilized.

Example I

A meat flavored high fat filling is prepared from following ingredients:

|  | Parts |
|---|---|
| Liquid oil (Durkex 100) | 100 |
| Colloidal silicon dioxide | 2 |
| Glycerol | 5 |
| Meat flavoring | 2 |
| Other condiments (species, salts, etc.) | 3 |

The shortening is prepared by utilizing the procedure described in the preceding paragraph. When the shortening has cooled the meat flavoring and other condiments are blended in. The meat flavored high fat filling (approximately 89 percent oil) is now ready for use. The product will be found to have a thick-spreading consistency and will be quite stable at elevated temperatures. It may be utilized as a spread or as a component of a filling.

Example II

A high fat topping such as a sugar icing can be prepared from the following ingredients:

|  | Parts |
|---|---|
| Sugar (pulverized) | 64.2 |
| Shortening (Arotex-Durkee) | 15.0 |
| Water | 13.0 |
| Dextrose | 5.0 |
| Colloidal silicon dioxide | 1.5 |
| Propylene glycol | 1.0 |
| Salt | 0.3 |

The icing is prepared as follows: Melt the shortening and propylene glycol together and heat to a temperature of 150° to 200° F., add the silicon dioxide and mix until the product is smooth, add the remaining ingredients and the water alternately until a smooth paste is formed, continue mixing at a high speed for about 5 minutes. The product is now ready for use. It will be found that the icing thus prepared can be used to coat a toaster product, and that the icing will not run when the product is exposed to elevated temperatures in the toaster.

Example III

A high fat filling suitable for use in a toaster product can be prepared from the following ingredients:

|  | Parts |
|---|---|
| Liquid oil (Durkee 100) | 15.2 |
| Peanut butter | 28.9 |
| Silicon dioxide | 1.2 |
| Chocolate coating (sugar plus cocoa mix) | 29.9 |
| Sugar | 24.0 |
| Glycerol | 0.8 |

The filling is prepared as follows: Heat the oil to about 200° F., and slowly blend in the silicon dioxide using a Hobart mixer at a number 3 speed to agitate the oil while blending the silicon dioxide, preheat the peanut butter to about 150 to 175° F. using a water bath procedure and blend the heated peanut butter in with the oil and silicon dioxide, using high speed agitation quickly add the glycerol and blend until the mix is uniform in consistency, melt the chocolate coating and blend in the melted chocolate and sugar until the mix is well blended and of a uniform consistency. The filling can now be cooled and used as a filling for a toaster product.

Example IV

A toaster product using the filling of Example III may be prepared as follows: A pastry dough is sheeted and cut into squares compatible for use to cover the sheet of dough. A second dough sheet is placed on top of the spread and the edges of the two dough sheets are compressed together so that the product formed is now a continuous dough sheet containing the filling within. The product is then baked in an oven at a temperature of from 300 to 425° F. for from 6 to 20 minutes. The product is then cooled and packaged in a moisture proof wrapping and is ready for the consumer. When the product is used by the consumer, it will be heated in a toaster and the shortening will not run or separate from the filling and seep into the dough crust.

Example V

A fat containing filling can be prepared from the following ingredients:

|  | Parts |
|---|---|
| Sugar | 42.5 |
| Corn syrup | 39.3 |
| Invert syrup | 10.2 |
| Oil | 5.52 |
| Colloidal silicon dioxide | 0.45 |
| Glycerol | 0.03 |
| Water | 2.00 |

The sugar, corn syrup and invert syrup are mixed together for about 2 to 3 minutes until the mixture is smooth. The oil and silicon dioxide are mixed together in a high sheer mixer for about 2 to 3 minutes and then added to the sugar-syrup mixture. The glycerol is then added and mixed for 1 to 2 minutes at high speed. Last, the water is added at high speed and mixed for 1 minute. The resulting product has a thick-spreading consistency and will not weep or run at elevated temperatures.

While a preferred method of preparing the shortening of this invention is to heat the oil before adding the silicon dioxide, it is also possible to prepare the shortening at room temperature. Using a high speed agitator, the silicon dioxide can be added to the room temperature oil and the bridging compound can then be metered in while continuing the agitation until a shortening with the desired consistency is obtained. For example, using a Sigma mixer 8 parts of silicon dioxide are blended into 100 parts of corn oil. Four parts of glycerine are then added over a period of 15 minutes. The resulting shortening had all of the desired characteristics of the product of this invention.

The foregoing examples are meant for illustrative purposes only and are not intended in any way to limit the invention. It should be readily apparent that the product of this invention can be equally useful in other products such as sweet rolls with icings, pizza pieces, and in salad dressings where an oil with a controlled viscosity may be put to good use. Obviously, many modifications and variations of the invention may be made without departing from the spirit and scope thereof and therefore only such limitations should be imposed as are indicated in the appended claims.

What is claimed is:

1. A shortening suitable for use in food products which may be heated prior to consumption, comprising, an edible oil 0.1% to 11% colloidal silicon dioxide by weight of the oil and 0.1% to 7% of bridging compound, by weight of the oil wherein the bridging compound is selected from the group consisting of: polyhydric alcohols; monopalmitate esters of polyhydric alcohols, monostearate esters of polyhydric alcohols, monooleate esters of polyhydric alcohols; polyoxyalkylene monopalmitate esters of polyhydric alcohols; polyoxyalkylene monostearate esters of polyhydric alcohols; and polyoxyalkylene monooleate esters of polyhydric alcohols, and wherein the particle size of the colloidal silicon dioxide does not exceed 50 millimicrons.

2. The shortening of claim 1 where the bridging compound is polyoxyethylene sorbitan monostearate.

3. The shortening of claim 1 where the polyhydric alcohol is selected from the group consisting of propylene glycol, glycerol, sorbitol, mannitol, xylitol, and polyethylene glycol 6000.

4. A pastry product which is heated prior to consumption comprising a dough crust containing within a food filling, having a shortening content of from 5% to 90% by weight of the filling, wherein the shortening is that recited in claim 1.

5. The product of claim 4 where the bridging compound is polyoxyethylene sorbitan monostearate.

6. The product of claim 4 where the polyhydric alcohol is selected from the group consisting of propylene glycol, glycerol, sorbitol, mannitol, xylitol and polyethylene glycol 6000.

7. A substantially baked, food filled dough product adapted for use as a toaster product, comprising a continuous dough crust containing a food filling, the dough crust being derived from a raw dough and having been baked and dried to a moisture content of from 10% to 25% by weight of the dough, said food filling having a shortening content of from 5% to 90% by weight of the filling, wherein the shortening is that recited in claim 1.

8. The product of claim 7 where the bridging compound is polyoxyethylene sorbitan monostearate.

9. The product of claim 7 wherein the polyhydric alcohol is selected from the group consisting of propylene glycol, glycerol, soribtol, mannitol, xylitol, and polyethylene glycol 6000.

10. A process for preparing a shortening suitable for use in food products which may be heated prior to consumption wherein the shortening has a thick-spreading consistency at room temperature and a spreadable consistency at temperatures up to the smoke point of the shortening which comprises heating an edible oil to a temperature of from 150° to 200° F., slowly adding colloidal silicon dioxide to the oil while vigorously mixing the oil, said silicon dioxide being added at a level of from 0.1% to 11% by weight of oil, quickly adding a bridging compound to the oil while mixing is continued, the bridging compound being in a liquid state prior to adding it to the oil, said bridging compound being added at a level of from 0.1% to 7% by weight of the oil, and cooling the shortening, said bridging compound being selected from the group consisting of: polyhydric alcohols; monopalmitate esters of polyhydric alcohols; monostearate esters of polyhydric alcohols; monooleate esters of polyhydric alcohols; polyoxyalkylene monopalmitate esters of polyhydric alcohols, polyoxyalkylene monostearate esters of polyhydric alcohols; and polyoxyalkylene monooleate esters of polyhydric alcohols.

11. The process of claim 10 where the bridging compound is polyoxyethylene sorbitan monostearate.

12. The process of claim 10 where the polyhydric alcohol is selected from the group consisting of propylene glycol, glycerol, sorbitol, mannitol, xylitol, and polyethylene glycol 6000.

References Cited

UNITED STATES PATENTS 2,163,913   6/1939   Otterbacher ---------- 99—139

OTHER REFERENCES

Lewkowitsch: Chemical Technology and Analysis of Oils, Fats and Waxes, vol. 2, 1922, MacMillan & Co., London, p. 57.

Chemical Engineering, vol. 67, No. 19, Sept. 19, 1960, p. 110.

How To Thicken Liquids with Cab-O-Sil, Publ. by Cabot Corp. (Boston, Mass.), pp. 1–7, May 1966.

JOSEPH M. GOLIAN, Primary Examiner

U.S. Cl. X.R.

99—118, 123, 92, 139, 144